(12) United States Patent
Weinman et al.

(10) Patent No.: US 12,673,622 B2
(45) Date of Patent: Jul. 7, 2026

(54) MULTI-PART DOOR GARNISH HAVING CONNECTION AND PASS-THROUGH ELEMENTS

(71) Applicant: Honda Motor Co., Ltd., Tokyo (JP)

(72) Inventors: Dakota E. Weinman, Dublin, OH (US); Jason Scott Borland, Marysville, OH (US); Jesse W. Schlabach, Marysville, OH (US); Timothy J. Rupp, Dublin, OH (US); David J. Rose, West Mansfield, OH (US); Hirofumi Takemoto, Dublin, OH (US); Masaki Kawamura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 415 days.

(21) Appl. No.: 18/366,250

(22) Filed: Aug. 7, 2023

(65) Prior Publication Data

US 2025/0050824 A1    Feb. 13, 2025

(51) Int. Cl.
*B60R 13/04*      (2006.01)

(52) U.S. Cl.
CPC ................................... *B60R 13/04* (2013.01)

(58) Field of Classification Search
CPC ...................................................... B60R 13/04
USPC .............................. 296/1.08; 428/31; 52/16.5
See application file for complete search history.

(56) References Cited

U.S. PATENT DOCUMENTS

| | | | | | |
|---|---|---|---|---|---|
| 4,388,355 | A | * | 6/1983 | Ikemizu | .................. B60R 13/04 |
| | | | | | 293/1 |
| 5,456,786 | A | * | 10/1995 | Cook | ...................... B29C 48/12 |
| | | | | | 156/244.11 |
| 5,456,957 | A | * | 10/1995 | Jackson | .............. B29C 45/1704 |
| | | | | | 264/271.1 |
| 7,198,319 | B2 | | 4/2007 | Schroder et al. | |
| 10,994,593 | B2 | | 5/2021 | Okazaki et al. | |
| 2013/0020822 | A1 | * | 1/2013 | Inoue | ................... B62D 35/007 |
| | | | | | 296/1.08 |
| 2018/0154844 | A1 | * | 6/2018 | Katayama | .............. B60R 13/04 |

FOREIGN PATENT DOCUMENTS

| | | | |
|---|---|---|---|
| CN | 105835791 | B | 6/2018 |
| CN | 216580735 | U | 5/2022 |
| JP | 2010173412 | A | 8/2010 |
| JP | 2015016772 | A * | 1/2015 |
| JP | 5971526 | B2 * | 8/2016 |
| JP | 6520522 | B2 | 5/2019 |

(Continued)

*Primary Examiner* — Amy R Weisberg
*Assistant Examiner* — Daniel R Digiovannantonio
(74) *Attorney, Agent, or Firm* — Plumsea Law Group, LLC

(57)                ABSTRACT

A garnish for a vehicle door includes an outer molding comprising a first surface forming an outer surface of the garnish, an inner liner molding comprising a second surface forming an inner surface of the garnish, a vertical edge formed between a top edge and a bottom edge, wherein the inner liner molding and the outer molding are bonded together, and the outer surface and the inner surface face away from each other, a first protruding structure extending outward from the second surface of the inner liner molding, and a second protruding structure, adjacent to the first protruding structure, and extending outward from the second surface of the inner liner molding, wherein the inner liner molding is formed without an undercut.

19 Claims, 6 Drawing Sheets

(56) References Cited

FOREIGN PATENT DOCUMENTS

| KR | 20010065208 | A | 7/2001 | |
|----|----|----|----|----|
| KR | 200262983 | Y1 | 1/2002 | |
| KR | 100377149 | B1 | 3/2003 | |
| KR | 100831501 | B1 | 5/2008 | |
| WO | WO-2019244690 | A1 * | 12/2019 | ............ B60R 13/04 |

* cited by examiner

SECTION AA

SECTION BB

MULTI-PART DOOR GARNISH HAVING CONNECTION AND PASS-THROUGH ELEMENTS

BACKGROUND

1. Field of the Disclosure

The present disclosure relates to vehicle body panels, and more particularly to a structure securing and locating a garnish panel on a vehicle.

2. Description of Related Art

Vehicles bodies are comprised for a variety of panels. When deciding what materials to use to form the panels, a manufacturer may consider factors including cost, weight, and durability. Different materials have different properties and are useful for different types of applications.

Metals, such as steel or aluminum, are typically used for body panels, such as hoods, doors, and quarter panels. These metals have high strength, good durability, and a quality appearance. Furthermore, metal may be formed into large complex shapes.

Plastics may be used more frequently for components that need to have high durability, light weight, and easy recycling characteristics, for example. Plastics may also be easy to manufacture and inexpensive to repair or replace. In some cases, plastics may be used in areas likely to be impacted by debris, sand, and salt.

In cases where metal and plastic panels meet, fit and finish may be a concern. For example, plastics have a higher coefficient of linear thermal expansion (CLTE) than steel and may require more space to grow and shrink. For at least this reason, a need exists for an improved structure for connecting a plastic garnish to a vehicle.

SUMMARY OF THE INVENTION

Embodiments of the present disclosure are directed to a multi-part lower door garnish having connection elements and a pass-through for locating the lower door garnish on a vehicle. The connection elements and the pass-through of the lower door garnish may improve Completely-Built-Unit/Completely-Built-Up (CBU) fit and finish of the vehicle.

According to an embodiment, a garnish for a vehicle door includes an outer molding comprising a first surface forming an outer surface of the garnish, an inner liner molding comprising a second surface forming an inner surface of the garnish, a vertical edge formed between a top edge and a bottom edge, wherein the inner liner molding and the outer molding are bonded together, and the outer surface and the inner surface face away from each other, a first protruding structure extending outward from the second surface of the inner liner molding, and a second protruding structure, adjacent to the first protruding structure, and extending outward from the second surface of the inner liner molding, wherein the inner liner molding is formed without an undercut.

The first protruding structure and the second protruding structure may be molded in structures of the inner liner molding.

The inner liner molding may extend in a first direction and the first protruding structure may include a first protruding portion and a second protruding portion, wherein the second protruding portion extends from the first protruding portion and is substantially parallel to the first direction. The second protruding portion may be a tape flange. The second protruding portion may form an outer edge of the inner liner molding, away from the second protruding structure. The second protruding portion may extend toward an edge of the outer molding, away from the second protruding structure. The second protruding structure may be a doghouse structure.

The garnish may include a third protruding structure adjacent to the first protruding structure and disposed lower or higher than the second protruding structure on the inner liner molding.

The garnish may include a pass-through support structure comprising a hole in an upper surface that is configured to receive a locator pin extending from the outer molding. The locator pin may align the outer molding and the inner liner molding and extend into the vehicle door.

According to an embodiment, a garnish for a vehicle door includes an outer molding comprising a first surface forming an outer surface of the garnish, an inner liner molding comprising a second surface forming an inner surface of the garnish, a vertical edge formed between a top edge and a bottom edge, wherein the inner liner molding and the outer molding are bonded together, and the outer surface and the inner surface face away from each other, a pass-through support structure extending outward from the second surface of the inner liner molding and comprising a hole in an upper surface of the pass-through support structure, and a locator pin extending from the outer molding and through the hold in the upper surface of the pass-through support structure, wherein the inner liner molding is formed without an undercut.

The pass-through support structure may be a molded in structure of the inner liner molding.

The locator pin may align the outer molding and the inner liner molding. The locator pin may extend into the vehicle door aligns the garnish and the vehicle door. A garnish may include a seal surrounding a portion of the locating pin between the inner liner molding and the vehicle door. The seal may have a thickness sufficient to contact the inner liner molding and the vehicle door.

The garnish may include a first protruding structure extending outward from the second surface of the inner liner molding, and a second protruding structure, adjacent to the first protruding structure, and extending outward from the second surface of the inner liner molding, wherein the first protruding structure and the second protruding structure are molded in structures of the inner liner molding.

According to an embodiment, a garnish for a vehicle door includes an outer molding comprising a first surface forming an outer surface of the garnish, an inner liner molding comprising a second surface forming an inner surface of the garnish, a vertical edge formed between a top edge and a bottom edge, wherein the inner liner molding and the outer molding are bonded together, and the outer surface and the inner surface face away from each other, a first protruding structure extending outward from the second surface of the inner liner molding, a second protruding structure, adjacent to the first protruding structure, and extending outward from the second surface of the inner liner molding, a pass-through support structure extending outward from the second surface of the inner liner molding and comprising a hole in an upper surface of the pass-through support structure, and a locator pin extending from the outer molding and through the hold in the upper surface of the pass-through support structure, wherein the inner liner molding is formed without an undercut.

The first protruding structure, the second protruding structure, and the pass-through support structure may be molded in structures of the inner liner molding.

The garnish may include a tape disposed on the first protruding structure and bonding the garnish to the vehicle door and a clip secured to the second protruding structure and attaching the garnish to the vehicle door, wherein the locator pin aligns the outer molding and the inner liner molding and extends into the vehicle door to align the garnish and the vehicle door.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Embodiments of the present disclosure are directed to an improved vehicle garnish panel. The garnish panel may be an outer panel of a vehicle. The garnish panel may be disposed over a body panel of the vehicle. For example, the garnish panel may be attached to an outside of the vehicle.

According to some embodiments of the present disclosure, the garnish panel, also known as cladding, includes one or more connection elements. The connection elements may securely fasten the garnish panel to the body panel of the vehicle. According to an embodiment, the connection elements of the garnish panel may be arranged to achieve an improved level of fit and finish of the garnish panel installed on the body panel of the vehicle.

The garnish panel, according to an embodiment, may be formed of a durable material. The garnish panel may resist or prevent possible damage from various objects. For example, the garnish panel may resist or present damage due to impacts from road debris or hail. In some implementations, the garnish panel may protect an underlying body panel of the vehicle from corrosion due to water and salt.

The garnish panel, according to an embodiment, may dampen or reduce noise that may otherwise enter a cable of the vehicle. For example, the garnish panel may reduce wind noise or reduce noise originating with the tires. A construction of the garnish panel may improve noise dampening characteristics.

The garnish panel may be formed of one or more materials. For example, portions the garnish panel may be formed of a material suitable for injection molding. More particularly, the garnish panel may be formed of, for example, a plastic, thermoplastic, polycarbonate, polypropylene, polyvinyl chloride (PVC), acrylic, resin, nylon, glass-filled nylon, acrylonitrile butadiene styrene (ABS), or a thermoplastic rubber. In some embodiments, portions of the garnish panel may be formed of other materials, such as a metal or a carbon-fiber composite material.

Figure 1:
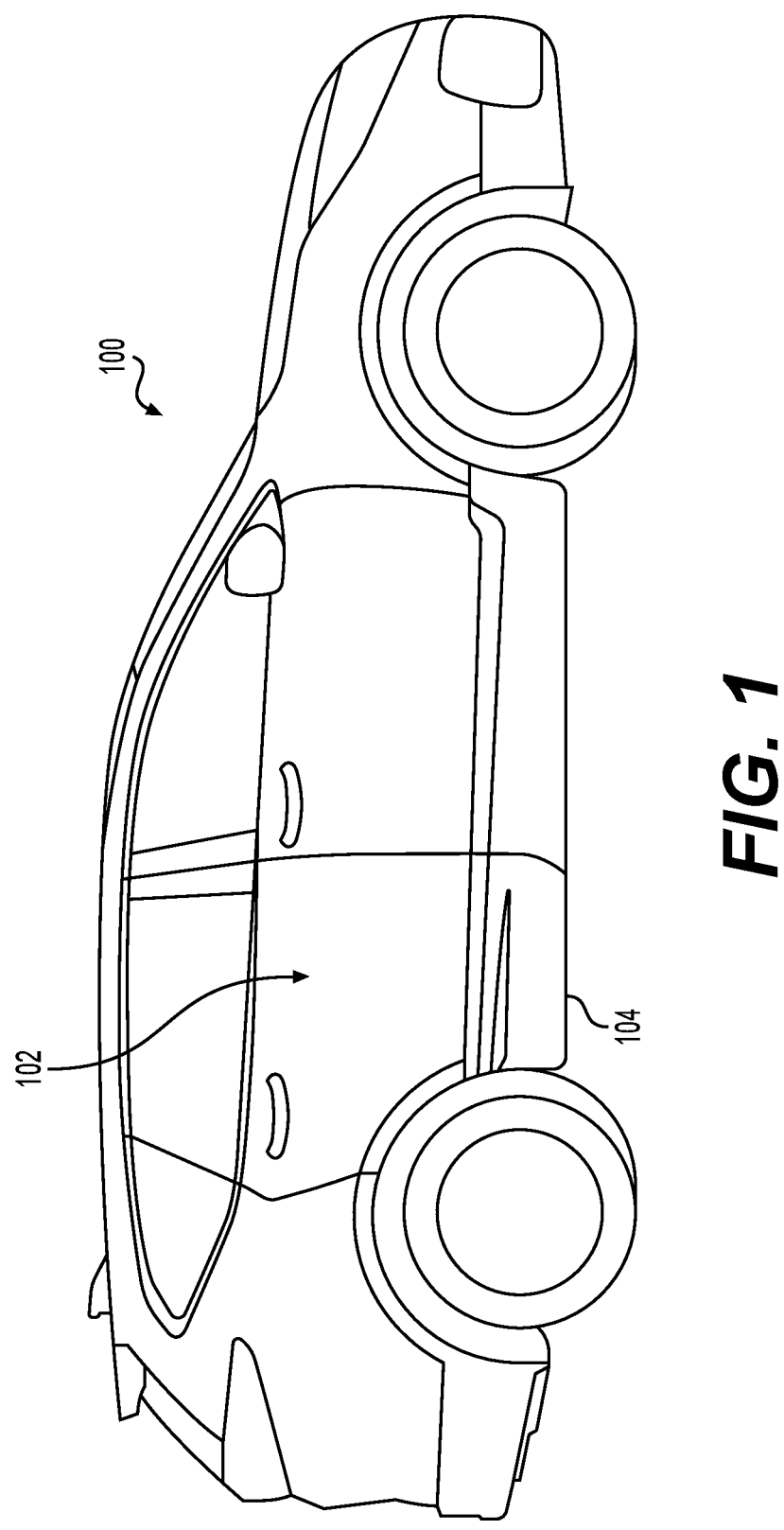
FIG. 1 illustrates a vehicle including a garnish panel according to some embodiments.

Referring to FIG. 1, a vehicle 100, may include a variety of different body panels. The body panels may include, for example, a hood, a door, a roof, a door, or a quarter panel. The vehicle 100 may include one or more garnish panels. These garnish panels may be attached to underlying body panels, for example. Garnish panels may be attached to a frame of the vehicle or attached accessories, for example.

The garnish panel may be attached to, for example, a rocker panel or a door of the vehicle 100. A vehicle rocker panel may be located along a side of the vehicle, between a front wheel well arch and a rear wheel well arch, and below the door(s) of the vehicle 100. In some embodiments, the garnish panel may be attached along a lower portion of the door, as illustrated in FIG. 1. For example, the vehicle 100 may include a right-rear door 102, and a first garnish panel 104 may be attached at the lower portion of the right-rear door 102.

According to some embodiments, the first garnish panel 104 may include one or more elements configured to attach the first garnish panel 104 to the vehicle 100. More particularly, the first garnish panel 104 may include one or more elements configured to attach the first garnish panel 104 to the right-rear door 102 of the vehicle 100.

Figure 2:
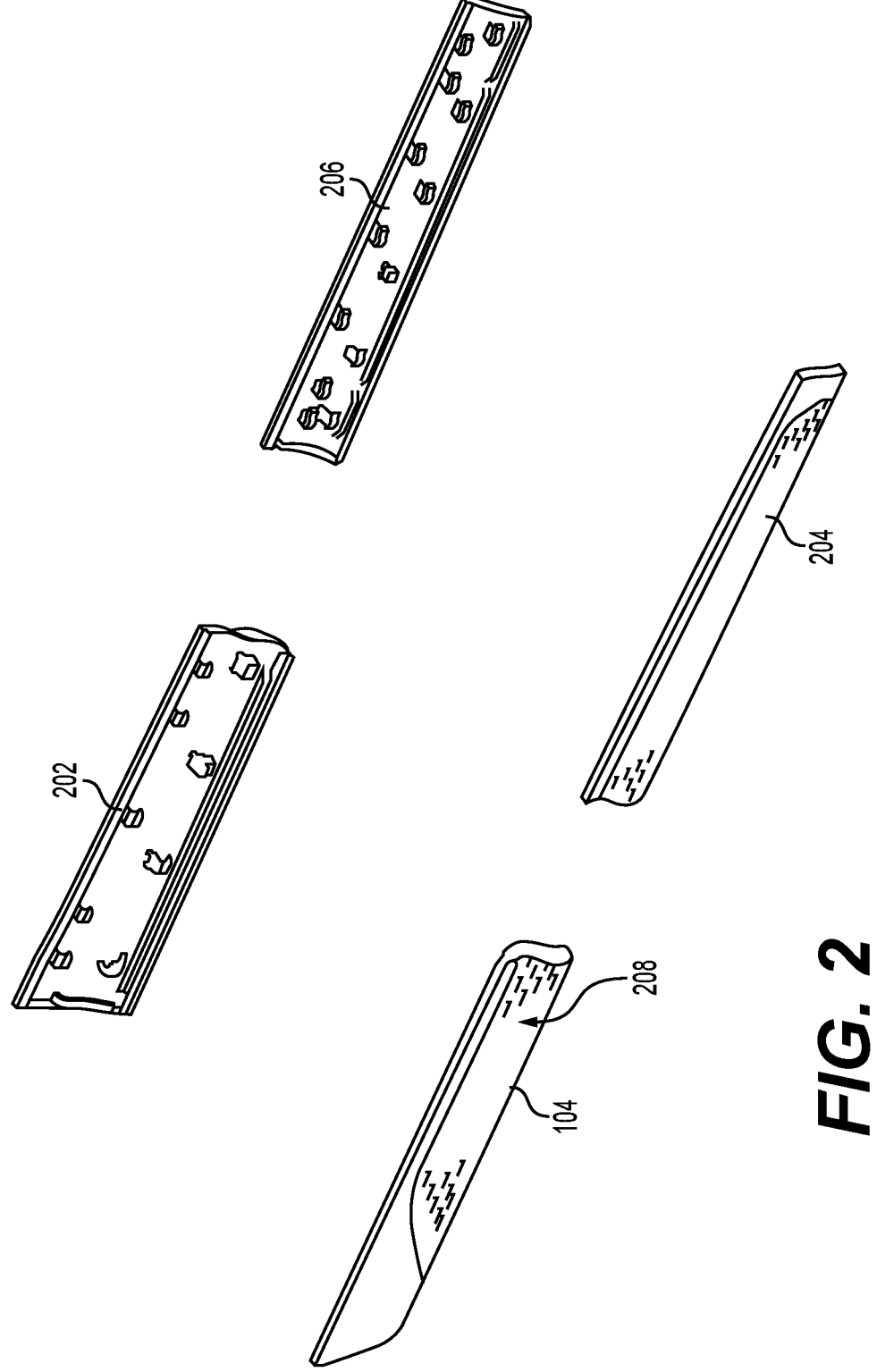
FIG. 2 illustrates a plurality of garnish panels according to some embodiments.

According to some embodiments, the vehicle 100 may include other garnish panels. The first garnish panel 104 is an example of a garnish panel, and other garnish panels may have a substantially similar construction. Referring to FIG. 2, the vehicle 100 may include the first garnish panel 104, which may be attached to the right-rear door 102, a second garnish panel 202, a third garnish panel 204, and a fourth garnish panel 206. The second garnish panel 202 may be configured for attachment to a rear-left door, the third garnish panel 204 may be configured for attachment to a front-right door, and the fourth garnish panel 206 may be configured for attachment to a front-left door. The vehicle 100 may include additional garnish panels. The vehicle 100 may include fewer garnish panels.

The first garnish panel 104 may have an outer surface 208. The outer surface 208 may be exposed to an outside environment. The outer surface 208 may have, for example, a texture or aerodynamic characteristics.

Figure 3:
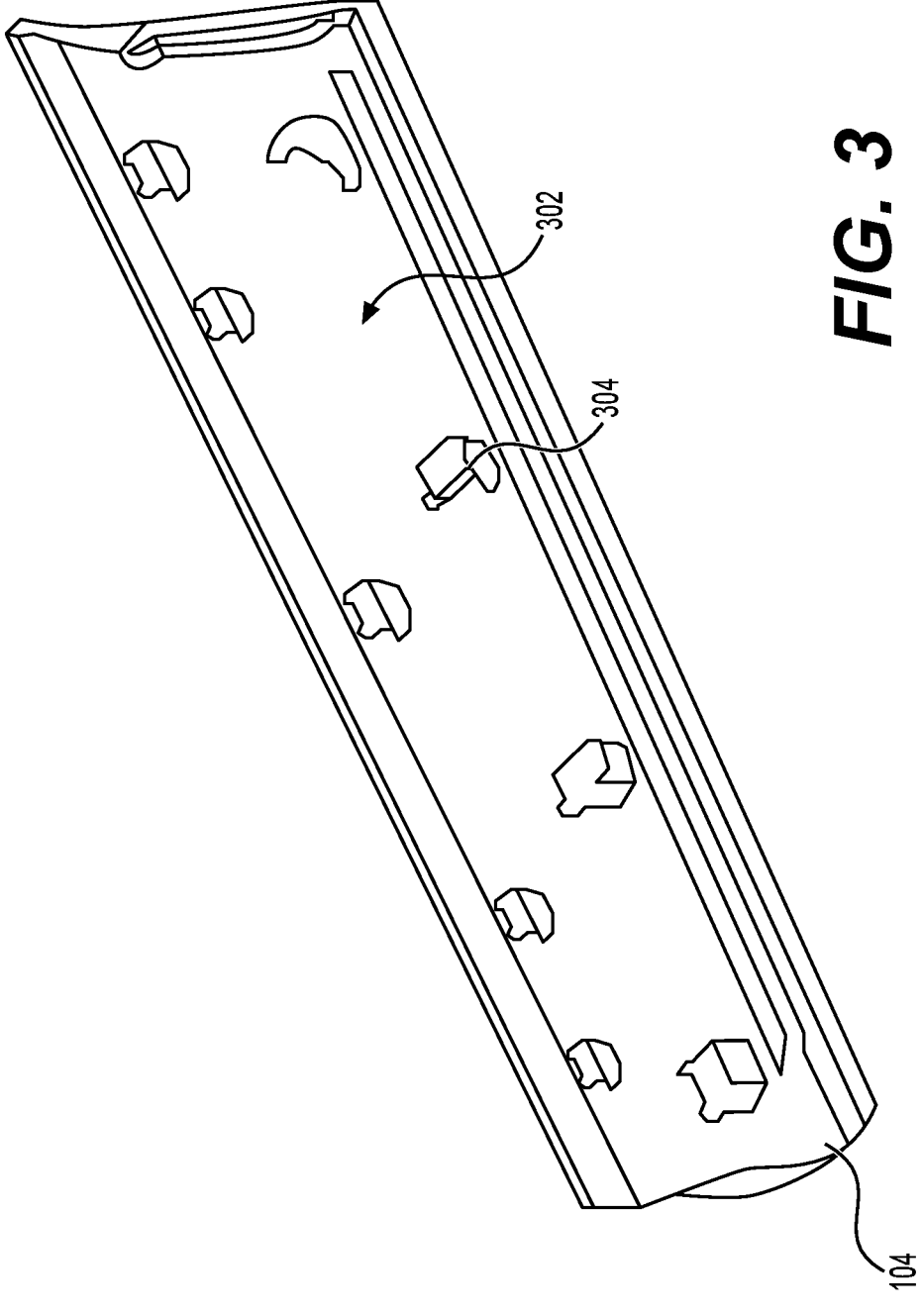
FIG. 3 illustrates an inner surface of the garnish panel of FIG. 1 according to some embodiments.

Referring to FIG. 3, the first garnish panel 104 may include a plurality of elements, including at least two panel components. For example, the panel components of the first garnish panel 104 may include an outer molding and an inner liner molding. The first garnish panel 104 may include an inner surface 302. More particularly, the inner surface 302 may be a surface of the inner liner molding. The inner liner molding may be attached to the outer molding. A structure of the first garnish panel 104 will be described in more detail below.

The first garnish panel 104 may include one or more connection elements for attaching the first garnish panel 104 to the vehicle. A connection element may be an extension of the outer molding or the inner liner molding, for example. A connection element may be, for example, a clip that may be fixed to a structure of the first garnish panel 104. For example, a connection element may be disposed on the inner surface 302 of the first garnish panel 104.

The first garnish panel 104 may include a protruding structure 304 of the inner liner molding. The protruding structure 304 may extend from the inner surface 302 of the inner liner molding. The protruding structure 304 may be molded in structures. That is, the protruding structure 304 may be structures formed during a same molding process as the inner surface 302, and the inner surface 302 having the protruding structure 304 is a unitary piece.

The protruding structure 304 may be a doghouse structure used to connect the first garnish panel 104 to the vehicle. For example, the doghouse structure may support a connection element. In another example, protruding structure 304 may be a pass-through support structure that may include a hole in a surface that may receive and locate a locator pin.

Figure 4:
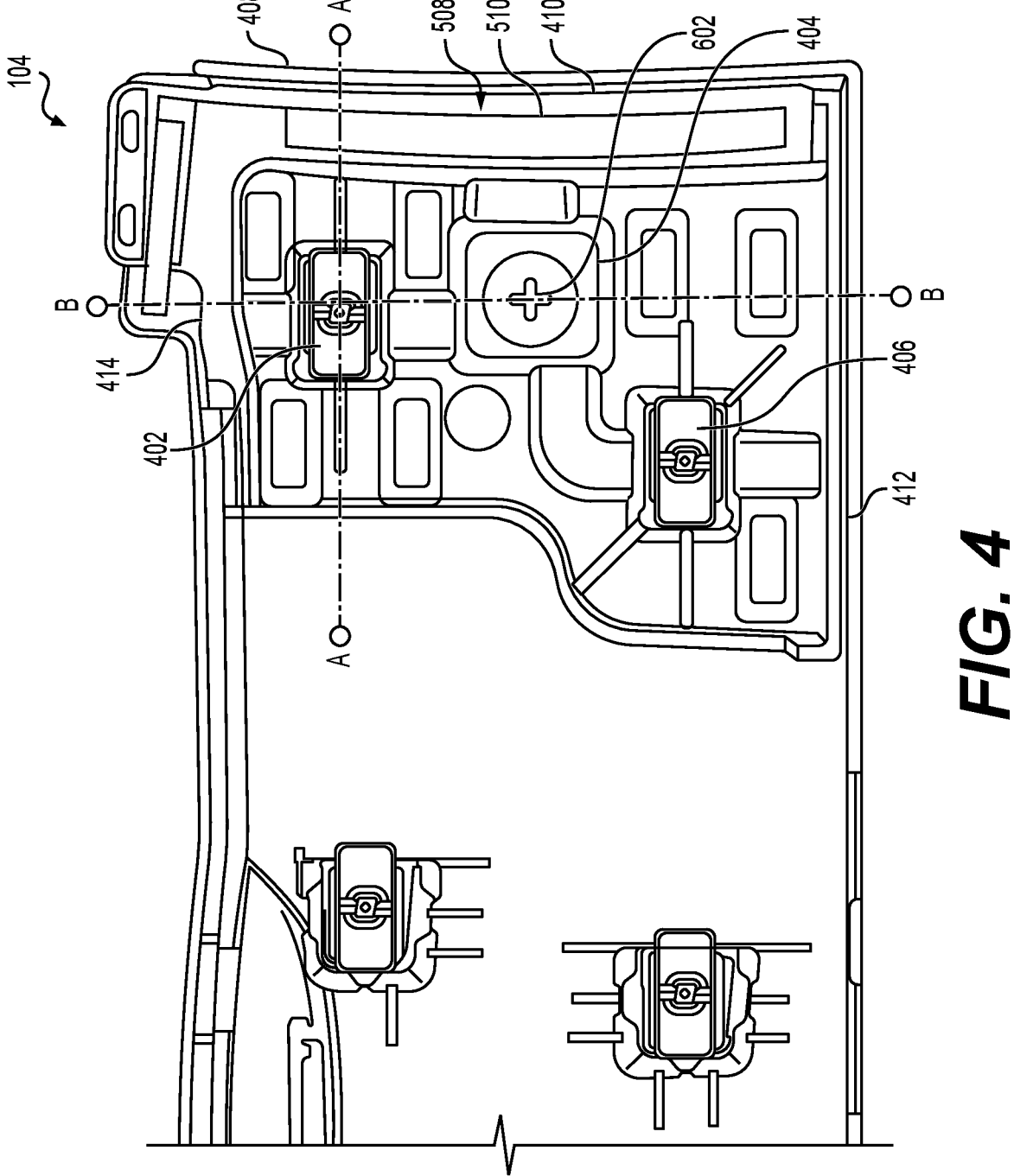
FIG. 4 illustrates a portion of the garnish panel of FIG. 1 including connection elements according to some embodiments.
Figure 5:
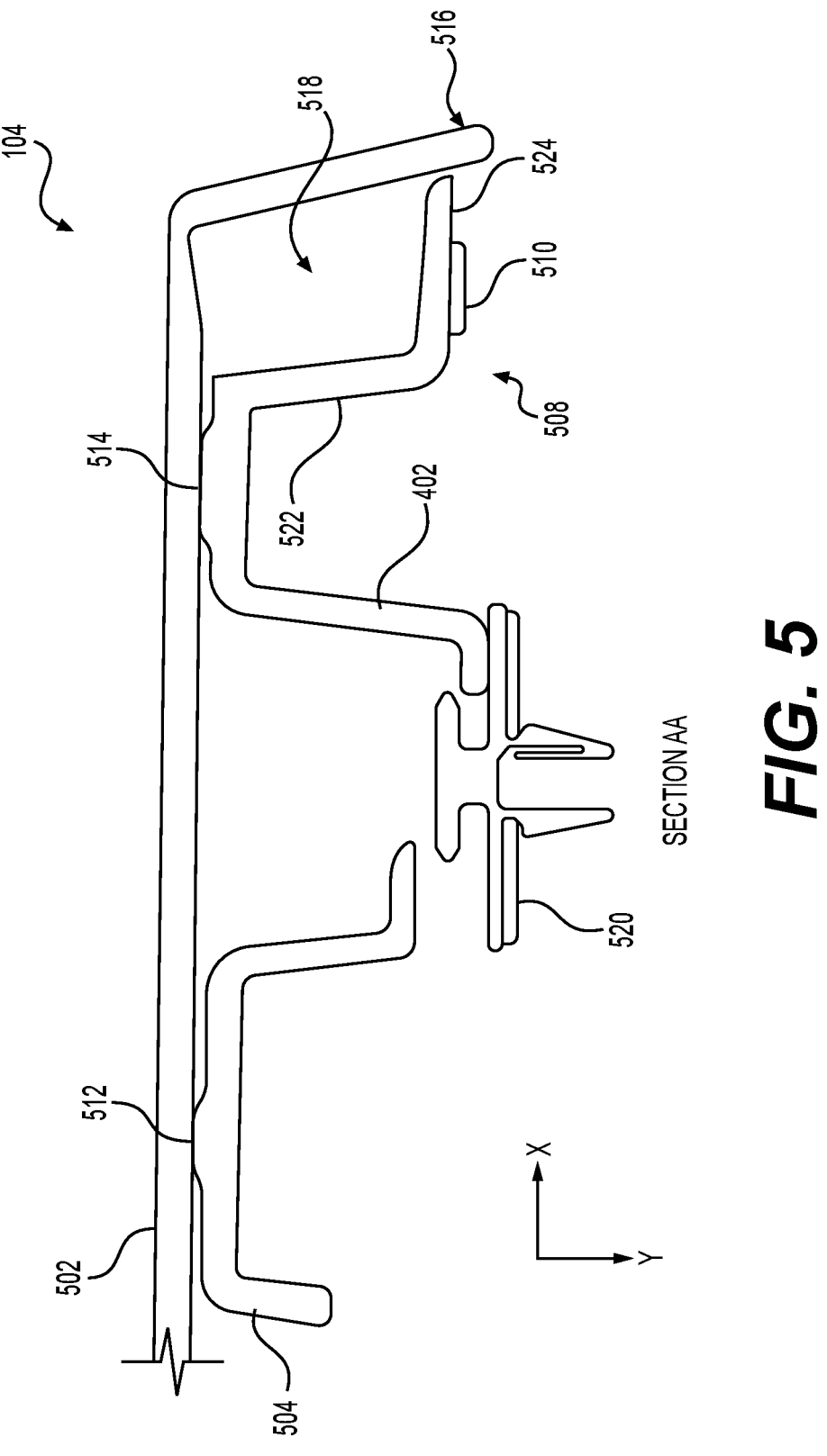
FIG. 5 illustrates a portion of the garnish panel of FIG. 1 including a tape flange and a doghouse structure according to some embodiments.
Figure 6:
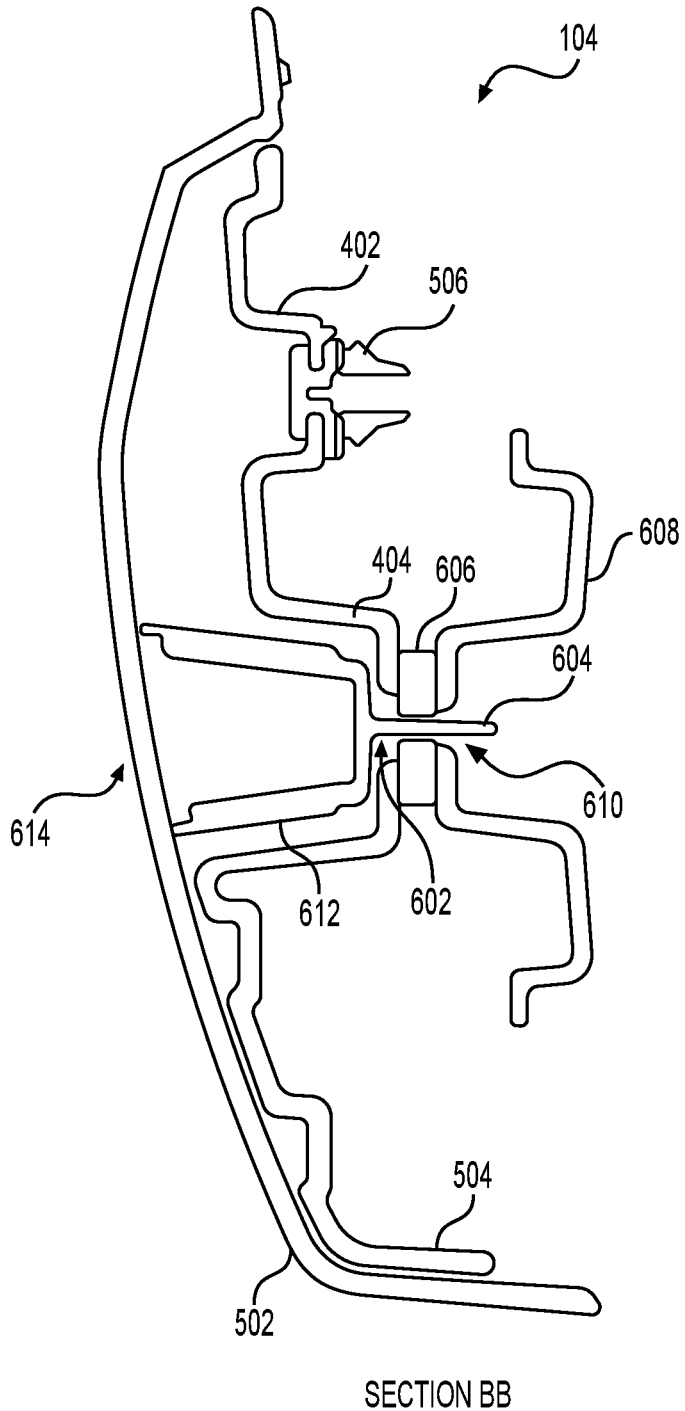
FIG. 6 illustrates a portion of the garnish panel of FIG. 1 including a locator pin according to some embodiments.

Referring to FIG. 4, the first garnish panel 104 may include a second doghouse structure 402 and a pass-through support structure 404. FIG. 4 illustrates a first cross-section AA and a second cross-section BB for explaining details of the first garnish panel 104. FIG. 5 is a view along the first cross-section AA, including the second doghouse structure 402. FIG. 6 is a view along the second cross-section BB, including the second doghouse structure 402 and the pass-through support structure 404.

As described above, the second doghouse structure 402 and the pass-through support structure 404 may be protruding structures extending from the inner surface 302 of the inner liner molding. The second doghouse structure 402 and the pass-through support structure 404, which may be protruding structures, may be molded in structure of the inner liner molding.

Also shown in FIG. 4 is a third doghouse structure 406. The second doghouse structure 402 and the third doghouse structure 406 may be dual doghouse arrangement. In the dual doghouse arrangement, the second doghouse structure 402 may be disposed above the third doghouse structure 406 on the first garnish panel 104. Both the second doghouse structure 402 and the third doghouse structure 406 of the dual doghouse arrangement may be disposed within about 75 millimeters of a vertical edge 408 of the first garnish panel 104. In some embodiments, the dual doghouse arrangement may be disposed within about 50 millimeters of the vertical edge 408 of the first garnish panel 104. Further still, the dual doghouse arrangement may be disposed within less than about 50 millimeters of the vertical edge 408 of the first garnish panel 104. It should be understood that the locations of the second doghouse structure 402 and the third doghouse structure 406 near the vertical edge 408 of the first garnish panel 104 are not limited by considerations of an injection mold slide.

Referring to FIG. 5, the first garnish panel 104 may include an outer molding 502 and an inner liner molding 504. The outer molding 502 may include the outer surface 208 (see FIG. 2). The inner liner molding 504 may include the inner surface 302 (see FIG. 3). The outer surface 208 and the inner surface 302 may face away from each other.

According to some embodiments, the outer molding 502 and the inner liner molding 504 may be formed by separate processes. For example, the outer molding 502 may be formed by a first injection molding process and the inner liner molding 504 may be formed by a second injection molding process. The outer molding 503 and the inner liner molding 504 may be formed of a same material or formed of different materials. For example, the outer molding 503 and the inner liner molding 504 may both be formed of a plastic. In another example, the outer molding 503 may be formed of a metal or a carbon-fiber composite, and the inner liner molding 504 may be formed of a plastic.

According to an embodiment, the inner liner molding 504 and the outer molding 502 may be connected together. For example, the inner liner molding 504 may be bonded to the outer molding 502. The bonding may be performed using, for example, an adhesive, hot air welding, heat staking using heat and pressure, ultrasonic welding, or plastic overmolding. In another example, the inner liner molding 504 and the outer molding 502 may be connected together using a fastener, such as a clip.

The inner liner molding 504 may be connected to the outer molding 502 at a plurality of locations. For example, the inner liner molding 504 may be bonded to the outer molding 502 at a first bump portion 512 of the inner liner molding 504 and at a second bump portion 514 of the inner liner molding 504. The bump portions may be protrusions that extend from one of the moldings toward the other molding. The bump portions may ensure contact between the outer molding 502 and the inner liner molding 504 at certain areas, that is, at the bump portions.

While the inner liner molding 504 is illustrated as including the first bump portion 512 and the second bump portion 514, the bump portions may be omitted. In another example, the outer molding 502 may include bump portions. That is, one or more, or none of the outer molding 502 and the inner liner molding 504 may include bump portions.

According to an embodiment, as the inner liner molding 504 may be formed separately from the outer molding 502, features of the inner liner molding 504 may be disposed at or near an edge 516 of the outer molding 502 once the outer molding 502 and the inner liner molding 504 are bonded together. For example, in a case where the inner liner molding 504 is formed by injection molding, an injection mold may be used to form the inner liner molding 504 including a tape flange 508 at a vertical edge 410 (see FIG. 4) of the inner liner molding 504. For example, an edge of the tape flange 508 may be the vertical edge 410 of the inner liner molding 504 that extends between a bottom edge 412 (see FIG. 4) and a top edge 414 (see FIG. 4) of the inner liner molding 504.

As described above, the tape flange 508 may be a protruding structure extending from the inner surface 302 (see FIG. 3) of the inner liner molding 504. The tape flange 508, which may be a protruding structure 304 (see FIG. 3), may be molded in structure of the inner liner molding 504.

According to an embodiment, the outer molding 502 and the inner liner molding 504 extend in a first direction X along an edge of the door, and the tape flange 508 may comprise a first protruding portion 522 and a second protruding portion 524. The first protruding portion 522 may extend in a second direction Y. The second protruding portion 524 may extend from the first protruding portion 522.

The first protruding portion 522 may extend substantially perpendicular to the first direction X. More generally, the first protruding portion 522 may extend from the inner liner molding at an angle between about 60 degrees and 120 degrees from the first direction. Other configurations are contemplated, such that the tape flange 508 may be adjacent to the underlying panel of the vehicle.

The second protruding portion 524 may extend substantially parallel to the first direction X. The second protruding portion 524 may extend away from the second doghouse structure 402. In the example in which the second protruding portion 524 extends away from the second doghouse structure 402, no other portion of the inner liner molding 504 may form an undercut.

The first protruding portion 522 may facilitate the second protruding portion 524 of the tape flange 508 being adjacent to an underlying panel of the vehicle, for example, where the adhesive tape 510 can bond the first garnish panel 104 to the vehicle. The tape flange 508 may be configured to support an adhesive tape 510 (see also FIG. 4). The adhesive tape 510 may be a double-sided adhesive tape. Thus, the adhesive tape 510 may be used, for example, to bond the first garnish panel 104 to the body panel the vehicle.

As illustrated in FIG. 5, the tape flange 508 may be formed over a void 518. The void 518 may open toward an edge of the inner liner molding 504. That is, the tape flange 508 may extend toward the edge 516 of the outer molding 502 of the first garnish panel 104. The tape flange 508 may be formed without another layer of the inner liner molding 504 being disposed above or below. That is, the tape flange 508 may be formed with the void 518 and without an undercut. In an embodiment, an entire span of the inner liner molding 504 may be formed without an undercut that may result in the use of an injection mold slide.

In a process of releasing the inner liner molding 504 from an injection mold, a lifter or ejector may move the inner liner molding 504 out of the mold, for example. In this way, the tape flange 508 may be formed at the edge of the inner liner molding 504. A doghouse may similarly be formed at the edge of the inner liner molding 504.

In an embodiment, a distance between the tape flange 508 or the second doghouse structure 402 and an edge of the first garnish panel 104 may not be limited by use of an injection mold slide. For example, the tape flange 508 or the second doghouse structure 402 may be disposed at the edge of the first garnish panel 104.

Further, a distance between the tape flange 508 and the second doghouse structure 402 may be less than about 50 millimeters, or about 25 millimeters. In a case where a conventional tape flange extends inward and away from an edge of garnish, the distance between a tape flange and an adjacent doghouse would need to be sufficient to accommodate an injection mold slide. For example, the distance between the tape flange and the adjacent doghouse would be greater than 50 millimeters, and a distance between the adjacent doghouse and an edge of the garnish may be greater than 75 millimeters. According to an embodiment, the distance between the tape flange 508 and the second doghouse structure 402 is not limited by an injection mold slide. For example, an injection mold associated with forming the inner liner molding 504 including the tape flange 508 may eject the piece without the use of an injection mold slide, since the inner liner molding 504 may be formed without an undercut. Accordingly, the distance between the tape flange 508 and the second doghouse structure 402 may be less than that needed for an injection mold slide to clear a mold.

The connection element, e.g., a clip or the adhesive tape 510, at the edge of the inner liner molding 504 may facilitate improved fit and finish of the first garnish panel 104. For example, when the first garnish panel 104 is connected to the body panel of the vehicle, the tape flange 508 at the edge of the inner liner molding 504 may not be limited by clearance limitations imposed by an injection mold slide (or slider), such as in a case where a garnish panel is formed as a unitary piece. In some embodiments, the connection element at the edge of the inner liner molding 504 may achieve reduced gapping where the first garnish panel 104 meets a surface of the body panel of the vehicle and may enable the first garnish panel 104 to have improved resistance to deflection at an edge thereof.

As illustrated in FIG. 5, the second doghouse structure 402 may receive and secure a clip 506 to the first garnish panel 104. The clip 506 is an example of a connection element. The clip 506 may extend from the first garnish panel 104 and engage with a hole in a body panel 520 of the vehicle to attach the first garnish panel 104 to the body panel 520 of the vehicle. Further, the adhesive tape 510 may be adhered to the tape flange 508 and a portion of the body panel 520 of the vehicle. Other connection elements are contemplated. For example, the first garnish panel 104 may include a datum pass-through, a snap, a clip, or a tape flange.

Referring to FIG. 6, the second doghouse structure 402 and the pass-through support structure 404 are shown in cross-section. As described in connection with FIG. 5, the second doghouse structure 402 may receive and secure a clip 506 to the first garnish panel 104. The clip 506 may secure the first garnish panel 104 to the vehicle. According to an embodiment, the pass-through support structure 404 may include a first pass-through 602. The first pass-through 602 may be an opening in the inner liner molding 504.

The first pass-through 602 may receive a locating pin 604. The locating pin 604 may extend from the outer molding 502. For example, the outer molding 502 may include a support structure 612 extending from an inner surface of the outer molding 502 toward the inner liner molding 504, and the locating pin 604 may extend from an upper surface of the support structure 612.

The support structure 612 and the locator pin 604 may be a molded in portion of the outer molding 502. As illustrated, the outer molding 502 may include an undercut portion, for example, the support structure 612 may be an undercut structure of a main body 614 of the outer molding 502.

According to an embodiment, the support structure 612 and the pass-through support structure 404 may be aligned. For example, the support structure 612 may fit inside the pass-through support structure 404 when the outer molding 502 and the inner liner molder 504 are bonded. The support structure 404 may increase a strength of the main body 614 of the outer molding 502, for example, by providing a more direct connection to the underlying panel 608.

The locating pin 604 may be aligned with the first pass-through 602 of the inner liner molding 504. In this way, the outer molding 502 and the inner liner molding 504 may be aligned. An accuracy of an alignment of the outer molding 502 and the inner liner molding 504 may be improved by the locating pin 604 and the first pass-through 602.

As illustrated in FIG. 4, the first pass-through 602 of the pass-through support structure 404 may have an opening in the shape of a cross. The first pass-through 602 may have any shape. For example, the first pass-through 602 may be a circle, an oval, or a cross-shape. According to some embodiments, the locating pin 604 may have a shape matching the shape of the first pass-through 602.

According to an embodiment, the locating pin 604 may extend inward, beyond the inner surface of the inner liner molding 504. For example, the locating pin 604 may extend into a second pass-through 610 in an underlying panel 608 of the vehicle. Therefore, the locating pin 604 may align the outer molding 502 and the inner liner molding 504, and the locating pin 604 may further align the first garnish panel 104 and the underlying panel 608 of the vehicle. For example, the underlying panel 608 of the vehicle may be a metal door panel or a rocker panel.

According to an embodiment, the first pass-through 602 may be sealed by a seal 606. The seal 606 may surround the locating pin 604. The seal 606 may be formed of, for example, a foam material or a rubber material. The seal 606 may have a thickness sufficient to contact the underlying panel 608 of the vehicle when the first garnish panel 104 is attached to the vehicle. That is, the seal 606 may extend from a surface of the pass-through support structure 404 to the underlying panel 608 of the vehicle when the first garnish panel 104 is attached to the vehicle.

As described herein, the inner liner molding 504 may facilitate reduced clip spacing at an edge of the first garnish panel 104. The inner liner molding 504 may allow reduced spacing between protruding components of the first garnish panel 104 and the edge of the first garnish panel 104. According to some embodiments, the first garnish panel 104 may include the first pass-through 602, which may improve accuracy of alignment of the inner liner molding 504 and the outer molding 502.

According to an embodiment, the first garnish panel 104 may be formed of a material that can be manufactured with a variety of shapes and textures. For example, the first garnish panel 104 may be a decorative panel. In another example, the first garnish panel 104 may be an aerodynamic element, for example, that smooths airflow or creates downforce.

According to an embodiment, the inner liner molding 504 facilitates the location of connection elements at the edge of the first garnish panel 104, which may improve fit and finish. Inner liner molding 504 enables a layout of flanges and doghouses at or near an edge of the first garnish panel 104. Further, the locating pin 604 may align the outer molding 502 and the inner liner molding 504, and further align the first garnish panel 104 and the underlying panel 608 of the vehicle.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

We claim:

1. A garnish for a vehicle door comprising:
   an outer molding comprising a first surface forming an outer surface of the garnish;
   an inner liner molding comprising a second surface forming an inner surface of the garnish, a vertical edge formed between a top edge and a bottom edge, wherein the inner liner molding and the outer molding are bonded together, and the outer surface and the inner surface are facing away from each other;
   a first protruding structure extending outward from the second surface of the inner liner molding; and
   a second protruding structure, adjacent to the first protruding structure, and extending outward from the second surface of the inner liner molding; and
   a pass-through support structure comprising a hole in an upper surface that is configured to receive a locator pin extending from the outer molding;
   wherein the inner liner molding is formed without an undercut.

2. The garnish of claim 1, wherein the first protruding structure and the second protruding structure are molded in structures of the inner liner molding.

3. The garnish of claim 1, wherein the inner liner molding extends in a first direction and the first protruding structure comprises a first protruding portion and a second protruding portion, wherein the second protruding portion extends from the first protruding portion and is substantially parallel to the first direction.

4. The garnish of claim 3, wherein the second protruding portion is a tape flange.

5. The garnish of claim 3, wherein the second protruding portion forms an outer edge of the inner liner molding, away from the second protruding structure.

6. The garnish of claim 3, wherein the second protruding portion extends toward an edge of the outer molding, away from the second protruding structure.

7. The garnish of claim 1, wherein the second protruding structure is a doghouse structure.

8. The garnish of claim 1, further comprising a third protruding structure adjacent to the first protruding structure and disposed lower or higher than the second protruding structure on the inner liner molding.

9. The garnish of claim 1, wherein the locator pin aligns the outer molding and the inner liner molding and extends into the vehicle door.

10. A garnish for a vehicle door comprising:
    an outer molding comprising a first surface forming an outer surface of the garnish;
    an inner liner molding comprising a second surface forming an inner surface of the garnish, a vertical edge formed between a top edge and a bottom edge, wherein the inner liner molding and the outer molding are bonded together, and the outer surface and the inner surface are facing away from each other;
    a pass-through support structure extending outward from the second surface of the inner liner molding and comprising a hole in an upper surface of the pass-through support structure; and
    a locator pin extending from the outer molding and through the hole in the upper surface of the pass-through support structure,
    wherein the inner liner molding is formed without an undercut.

11. The garnish of claim 9, wherein the pass-through support structure is a molded in structure of the inner liner molding.

12. The garnish of claim 9, wherein the locator pin aligns the outer molding and the inner liner molding.

13. The garnish of claim 9, wherein the locator pin extends into the vehicle door aligns the garnish and the vehicle door.

14. The garnish of claim 13, further comprising a seal surrounding a portion of the locating pin between the inner liner molding and the vehicle door.

15. The garnish of claim 14, wherein the seal has a thickness sufficient to contact the inner liner molding and the vehicle door.

16. The garnish of claim 9, further comprising:
    a first protruding structure extending outward from the second surface of the inner liner molding; and
    a second protruding structure, adjacent to the first protruding structure, and extending outward from the second surface of the inner liner molding, wherein the first protruding structure and the second protruding structure are molded in structures of the inner liner molding.

17. A garnish for a vehicle door comprising:

an outer molding comprising a first surface forming an outer surface of the garnish;

an inner liner molding comprising a second surface forming an inner surface of the garnish, a vertical edge formed between a top edge and a bottom edge, wherein the inner liner molding and the outer molding are bonded together, and the outer surface and the inner surface are facing away from each other;

a first protruding structure extending outward from the second surface of the inner liner molding;

a second protruding structure, adjacent to the first protruding structure, and extending outward from the second surface of the inner liner molding;

a pass-through support structure extending outward from the second surface of the inner liner molding and comprising a hole in an upper surface of the pass-through support structure; and a locator pin extending from the outer molding and through the hole in the upper surface of the pass-through support structure, wherein the inner liner molding is formed without an undercut.

18. The garnish of claim 17, wherein the first protruding structure, the second protruding structure, and the pass-through support structure are molded in structures of the inner liner molding.

19. The garnish of claim 17, further comprising:

a tape disposed on the first protruding structure and bonding the garnish to the vehicle door; and a clip secured to the second protruding structure and attaching the garnish to the vehicle door, wherein the locator pin aligns the outer molding and the inner liner molding and extends into the vehicle door to align the garnish and the vehicle door.

* * * * *